US011862091B1

(12) United States Patent
Cheng

(10) Patent No.: US 11,862,091 B1
(45) Date of Patent: Jan. 2, 2024

(54) PIXEL CIRCUIT OF DISPLAY PANEL

(71) Applicant: NOVATEK Microelectronics Corp., Hsin-Chu (TW)

(72) Inventor: Kuo-Wei Cheng, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/094,407

(22) Filed: Jan. 9, 2023

(51) Int. Cl.
*G09G 3/3233* (2016.01)

(52) U.S. Cl.
CPC ... *G09G 3/3233* (2013.01); *G09G 2300/0852* (2013.01); *G09G 2310/0251* (2013.01); *G09G 2320/0233* (2013.01)

(58) Field of Classification Search
CPC ......... G09G 3/3233; G09G 2300/0852; G09G 2310/0251; G09G 2320/0233
See application file for complete search history.

(56) References Cited

U.S. PATENT DOCUMENTS

2020/0126478 A1* 4/2020 Lee ........................ G09G 3/325

* cited by examiner

*Primary Examiner* — Jonathan A Boyd
(74) *Attorney, Agent, or Firm* — Winston Hsu

(57) ABSTRACT

A pixel circuit of a display panel includes a driving transistor, first to fifth transistors, and a light emitting device. The driving transistor includes a first terminal, a second terminal and a gate terminal. The first transistor is coupled between a power supply terminal and the first terminal of the driving transistor. The second transistor is coupled between the first terminal of the driving transistor and the gate terminal of the driving transistor. The third transistor is coupled between the second terminal of the driving transistor and the gate terminal of the driving transistor. The fourth transistor is coupled between a data input terminal and the second terminal of the driving transistor. The fifth transistor is coupled to the second terminal of the driving transistor. The light emitting device is coupled between the fifth transistor and a reference voltage terminal.

9 Claims, 13 Drawing Sheets

PIXEL CIRCUIT OF DISPLAY PANEL

BACKGROUND OF THE INVENTION

1. Field of the Invention

The present invention relates to a pixel circuit of a display panel, and more particularly, to the structure of a pixel circuit of a display panel capable of canceling the offset of threshold voltages.

2. Description of the Prior Art

Among those next-generation display technologies, the micro organic light emitting diode (micro-OLED) panel has become important in recent years. Unlike conventional LED or OLED panels with their screens being built on a glass substrate, the screen of a micro-OLED panel is directly mounted to a silicon wafer. The silicon-based implementation can achieve a wide variety of benefits such as small size, light weight, low power consumption, high luminous efficiency, high contrast and high pixel density. With the above advantages, the micro-OLED panel is particularly suitable for augmented reality (AR) and virtual reality (VR) applications.

Similar to the conventional OLED panels, the micro-OLED panels also suffer from uneven brightness between display pixels that is caused by mismatch of driving transistors and/or OLEDs, which is called the Mura effect. People in the industry are making efforts to propose various pixel structures to improve the unevenness problem and solve the Mura effect for the display panels.

SUMMARY OF THE INVENTION

It is therefore an objective of the present invention to provide a novel pixel circuit for an organic light emitting diode (OLED) panel, especially a micro-OLED panel, so as to solve the abovementioned problems.

An embodiment of the present invention discloses a pixel circuit of a display panel. The pixel circuit comprises a driving transistor, a first transistor, a second transistor, a third transistor, a fourth transistor, a fifth transistor and a light emitting device. The driving transistor comprises a first terminal, a second terminal and a gate terminal. The first transistor comprises a first terminal and a second terminal, where the first terminal is coupled to a power supply terminal, and the second terminal is coupled to the first terminal of the driving transistor. The second transistor comprises a first terminal and a second terminal, where the first terminal is coupled to the first terminal of the driving transistor, and the second terminal is coupled to the gate terminal of the driving transistor. The third transistor comprises a first terminal and a second terminal, where the first terminal is coupled to the second terminal of the driving transistor, and the second terminal is coupled to the gate terminal of the driving transistor. The fourth transistor comprises a first terminal and a second terminal, where the first terminal is coupled to a data input terminal of the pixel circuit, and the second terminal is coupled to the second terminal of the driving transistor. The fifth transistor comprises a first terminal and a second terminal, where the first terminal is coupled to the second terminal of the driving transistor. The light emitting device comprises a first terminal and a second terminal, where the first terminal is coupled to the second terminal of the fifth transistor, and the second terminal is coupled to a reference voltage terminal to receive ground or negative voltage.

Another embodiment of the present invention discloses a pixel circuit of a display panel. The pixel circuit comprises a driving transistor, a first transistor, a second transistor, a third transistor, a fourth transistor, a fifth transistor, a light emitting device and a first capacitor. The driving transistor comprises a first terminal, a second terminal and a gate terminal. The first transistor comprises a first terminal and a second terminal, where the first terminal is coupled to a power supply terminal, and the second terminal is coupled to the first terminal of the driving transistor. The second transistor comprises a first terminal and a second terminal, where the first terminal is coupled to the first terminal of the driving transistor, and the second terminal is coupled to the gate terminal of the driving transistor. The third transistor comprises a first terminal and a second terminal, where the first terminal is coupled to the second terminal of the driving transistor, and the second terminal is coupled to the gate terminal of the driving transistor. The fourth transistor comprises a first terminal and a second terminal, where the first terminal is coupled to a data input terminal of the pixel circuit, and the second terminal is coupled to the first terminal of the driving transistor. The fifth transistor comprises a first terminal and a second terminal, where the first terminal is coupled to the second terminal of the driving transistor. The light emitting device comprises a first terminal and a second terminal, where the first terminal is coupled to the second terminal of the fifth transistor, and the second terminal is coupled to a reference voltage terminal to receive ground or negative voltage. The first capacitor comprises a first terminal and a second terminal, where the first terminal is coupled to the gate terminal of the driving transistor, and the second terminal is coupled to the first terminal of the driving transistor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
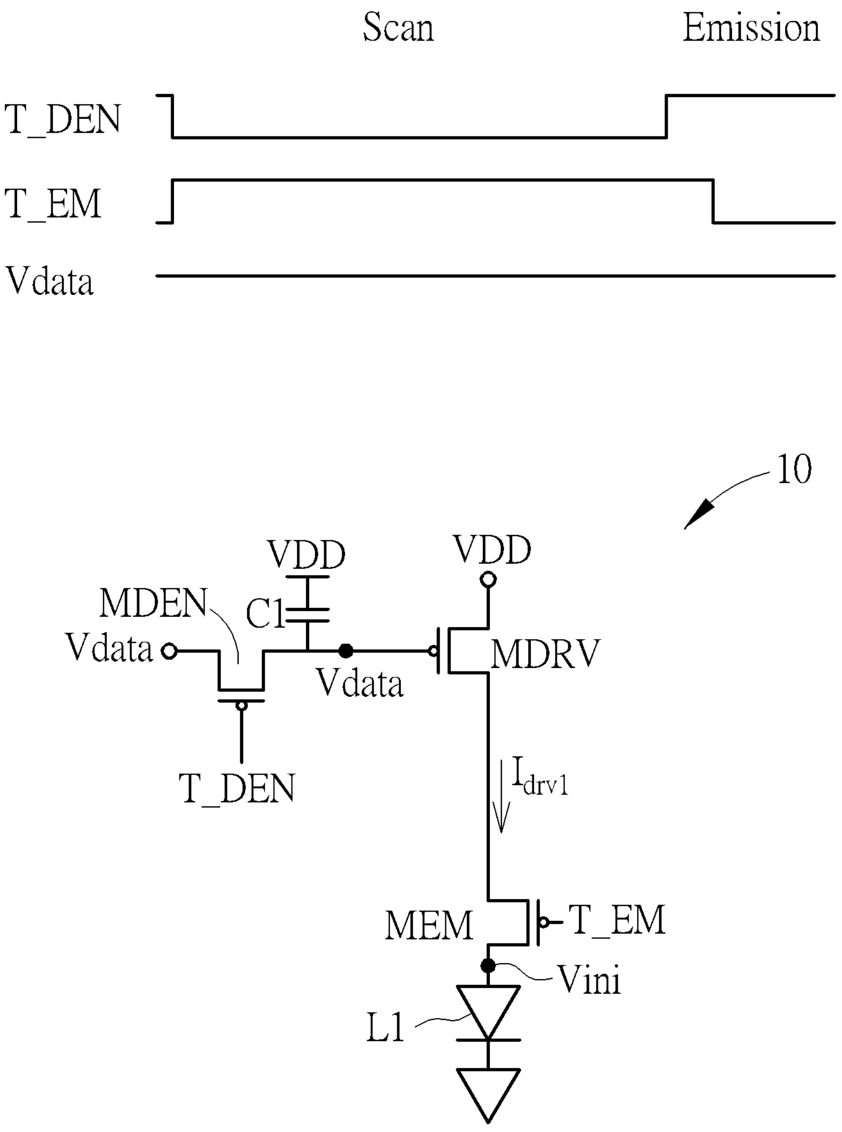
FIG. 1 is a schematic diagram of a pixel circuit of a display panel.

FIG. 1 is a schematic diagram of a pixel circuit 10 of a display panel. The display panel may be an organic light emitting diode (OLED) panel or a micro-OLED panel. The pixel circuit 10 includes a driving transistor MDRV, a data enable transistor MDEN, an emission control transistor MEM, a storage capacitor C1 and an OLED L1. The driving transistor MDRV is configured to control the OLED L1 to emit light. The data enable transistor MDEN may serve as a switch for receiving an input data Vdata. The input data Vdata that arrives at the gate terminal of the driving transistor MDRV may determine the current magnitude flowing through the OLED L1, thereby determining the brightness of the OLED L1. The emission control transistor MEM may serve as a switch for controlling the emission of the OLED L1.

The pixel circuit 10 may be operated by receiving a power supply voltage VDD, a data enable signal T_DEN and an emission control signal T_EM. More specifically, the data enable transistor MDEN is controlled by the data enable signal T_DEN, and the emission control transistor MEM is controlled by the emission control signal T_EM.

The operations of the pixel circuit 10 include two phases: a scan phase and an emission phase. In the scan phase, the data enable transistor MDEN is turned on and the emission control transistor MEM is turned off. The input data Vdata may be forwarded to the gate terminal of the driving transistor MDRV and stored in the storage capacitor C1. In the emission phase following the scan phase, the emission control transistor MEM is turned on. A driving current $I_{drv1}$, which is generated by the driving transistor MDRV based on the input data Vdata, may flow through the OLED L1 to determine the brightness emitted by the OLED L1.

In the driving transistor MDRV, the magnitude of the driving current $I_{drv1}$ may be determined based on the correspondence of the driving current $I_{drv1}$ and the source-to-gate voltage Vsg of the driving transistor MDRV. Based on the mobility of the driving transistor MDRV, the relationship of the driving current $I_{drv1}$ and the source-to-gate voltage Vsg may follow a square law or exponential law. For example, if the pixel circuit 10 is implemented with a thin-film transistor (TFT) process, the mobility is lower and the driving current $I_{drv1}$ output by the driving transistor MDRV may be relatively low, and it is more possible that the driving transistor MDRV operates in the saturation region to follow the square law. If the pixel circuit 10 is implemented with a complementary metal-oxide semiconductor (CMOS) process as the silicon-based implementation of the micro-OLED panel, the mobility is higher than in the TFT process. Therefore, in order to achieve identical current magnitudes, the driving transistor MDRV may operate in the sub-threshold region to follow the exponential law.

No matter whether the driving transistor MDRV operates based on the square law or exponential law, the driving current $I_{drv1}$ and the source-to-gate voltage Vsg have one-to-one correspondence, so that the driving current $I_{drv1}$ may be determined according to the source-to-gate voltage Vsg, which is further determined according to the input data Vdata. For the sake of brevity, the formula of square law is described hereinafter, as shown below:

$$I_{drv1}=\frac{1}{2}\beta[Vsg-Vthp]^2; \quad (1)$$

where β represents the gain factor of the driving transistor MDRV, and is determined according to the mobility, normalized oxide capacitance, and width/length ratio of the transistor; and Vthp is the threshold voltage of the driving transistor MDRV. Since the source voltage of the driving transistor MDRV equals the power supply voltage VDD and the gate voltage of the driving transistor MDRV equals the input data Vdata, Equation (1) may be rewritten as:

$$I_{drv1}=\frac{1}{2}\beta[VDD-Vdata-Vthp]^2. \quad (2)$$

Note that the threshold voltage Vthp is included in the formula for calculating the driving current $I_{drv1}$. In the display panel, the threshold voltage Vthp of different pixels may not be uniform due to process and/or device variations. The mismatch and offset of the threshold voltage Vthp may generate uneven brightness between the pixels, thereby generating the Mura effect. Therefore, the present invention provides a novel pixel circuit with appropriate controls to let the Mura effect caused by the offsets of the threshold voltage Vthp to be minimized.

Figure 2A:
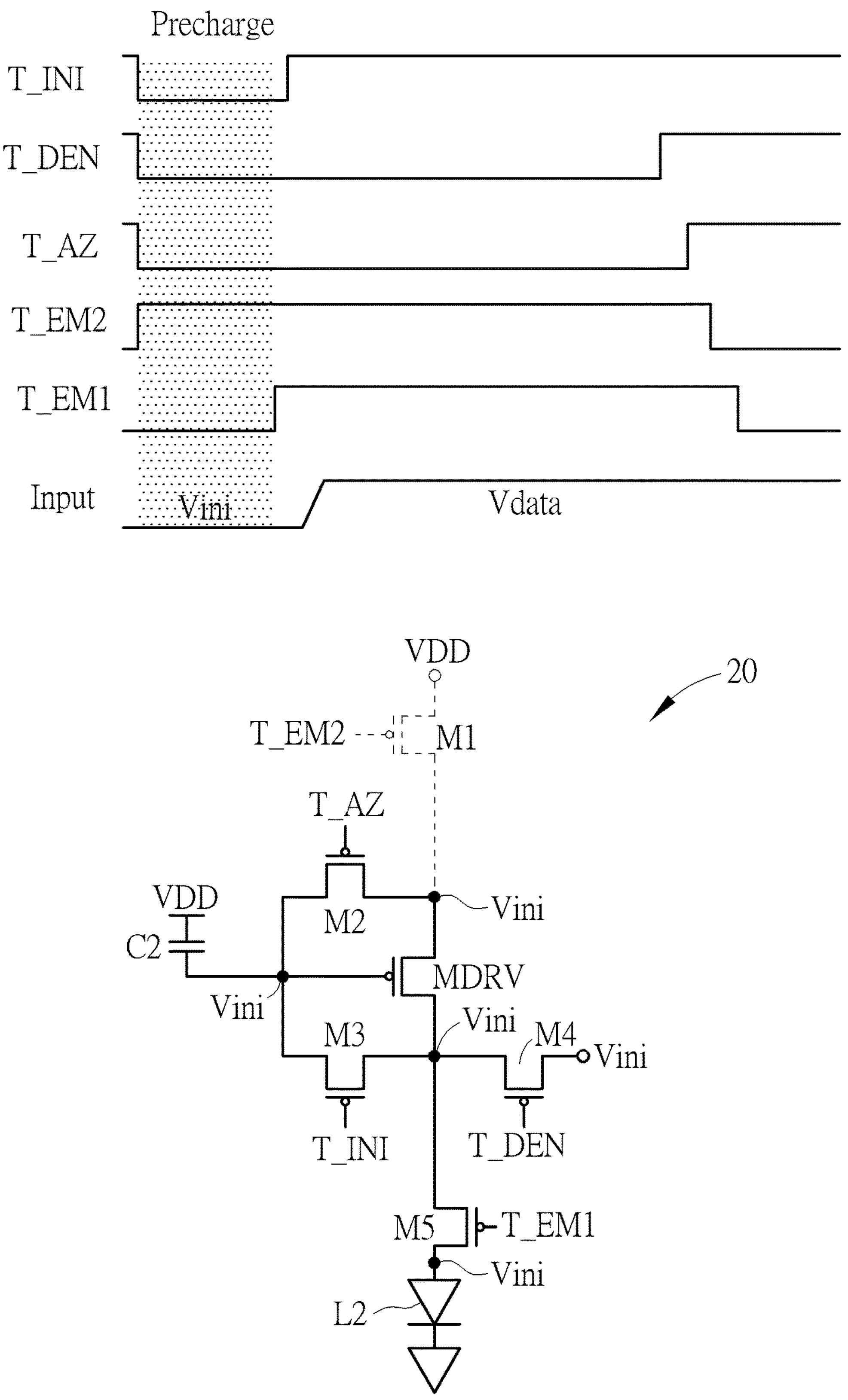
FIGS. 2A, 2B and 2C are schematic diagrams of a pixel circuit of a display panel according to an embodiment of the present invention.
Figure 2B:
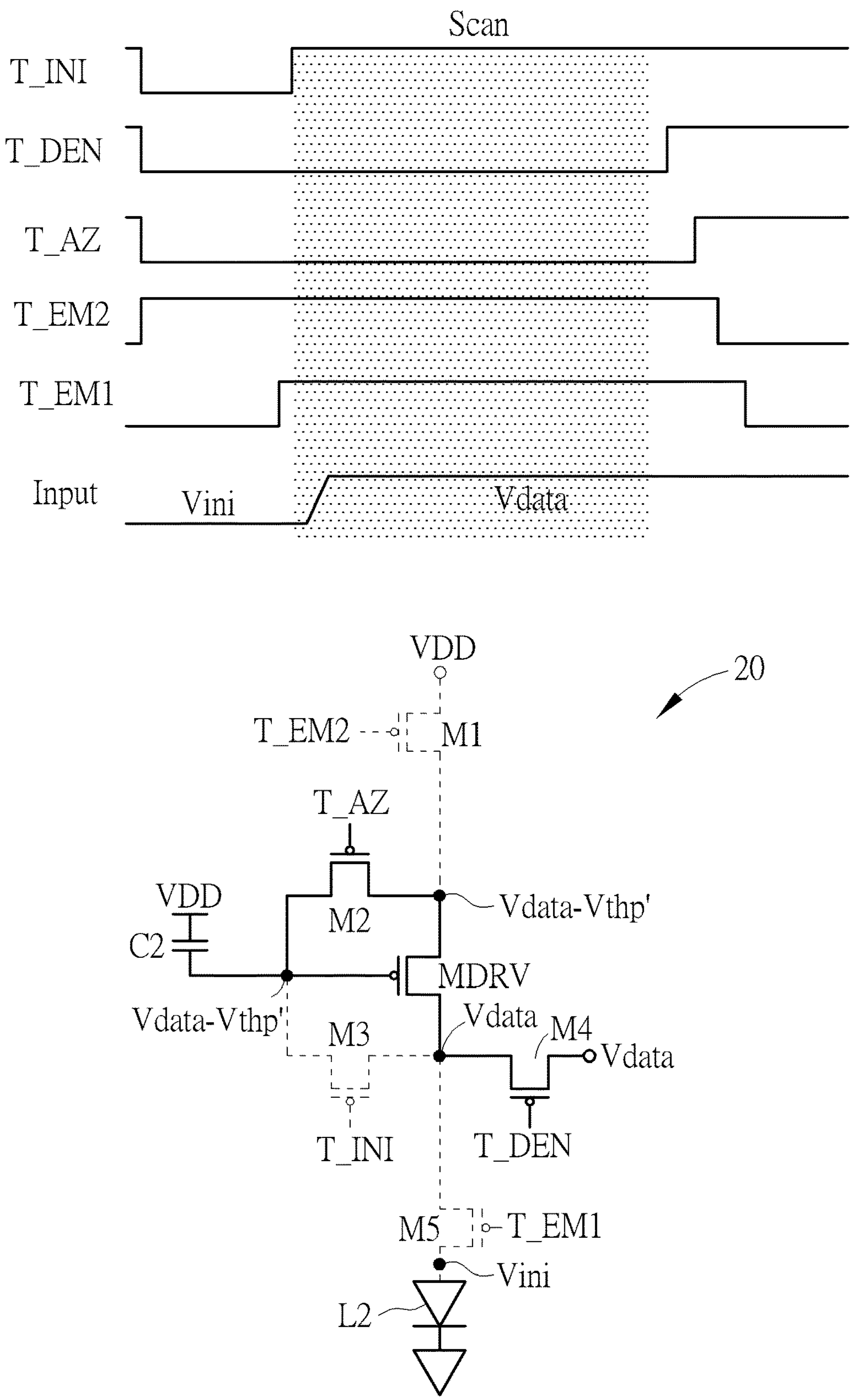
Figure 2C:
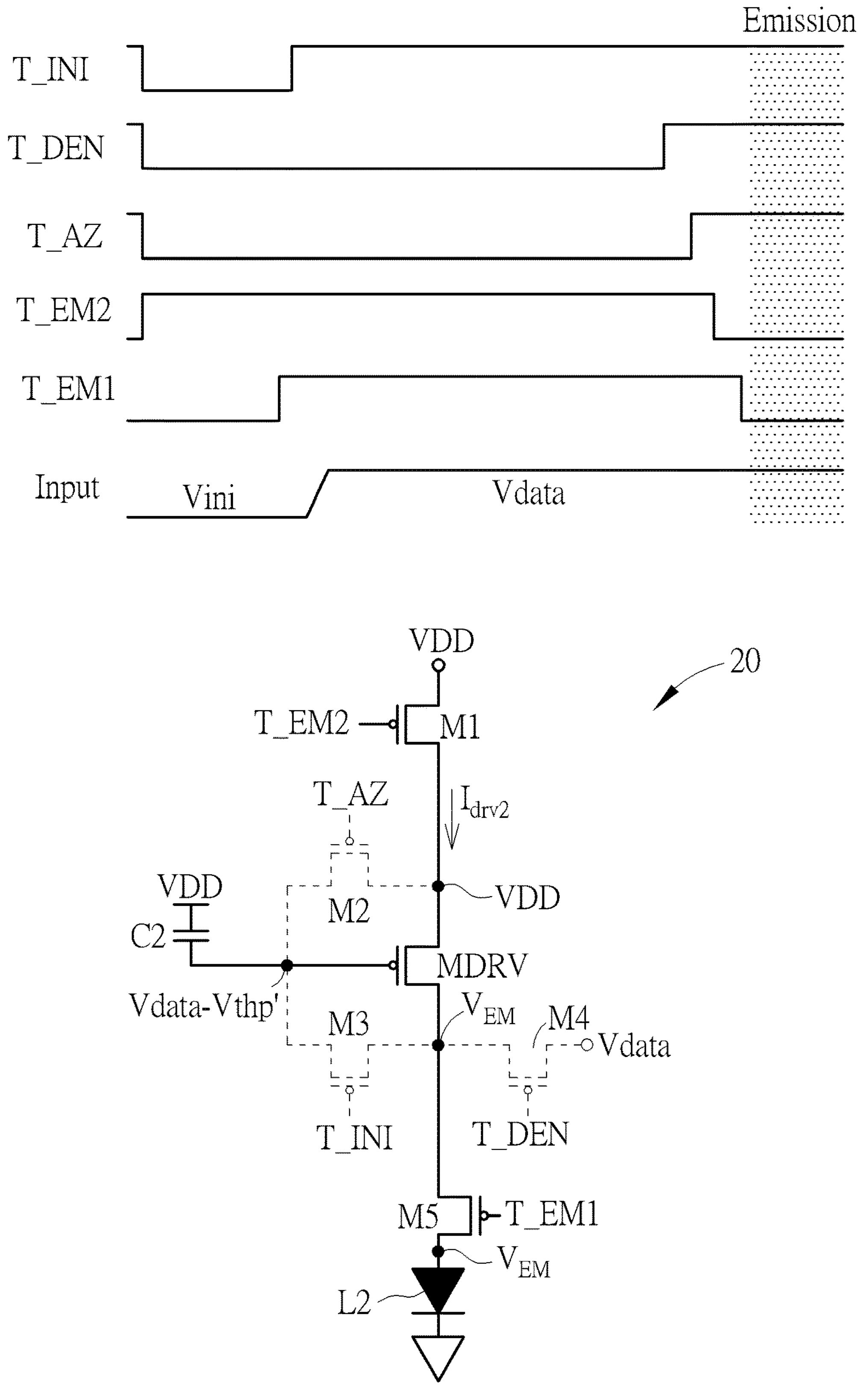

FIGS. 2A-2C are schematic diagrams of a pixel circuit 20 of a display panel according to an embodiment of the present invention. The pixel circuit 20 includes a driving transistor MDRV, 5 control transistors M1-M5, a storage capacitor C2 and a light emitting device L2, to realize a 6T1C structure. The driving transistor MDRV is configured to control the light emitting device L2 to emit light; that is, the driving transistor MDRV may generate a driving current $I_{drv2}$ according to the received input data Vdata, and output the driving current $I_{drv2}$ to drive the light emitting device L2 to emit light. The storage capacitor C2, which may be coupled between the gate terminal of the driving transistor MDRV and a power supply terminal that supplies the power supply voltage VDD, is configured to store the input data Vdata forwarded to the gate terminal of the driving transistor MDRV, as similar to the storage capacitor C1 of the pixel circuit 10.

The control transistors M1-M5 may be deployed and controlled appropriately to cancel the influence of the threshold voltage Vthp of the driving transistor MDRV on the driving current $I_{drv2}$. In detail, the control transistor M1 is coupled to the upper terminal of the driving transistor MDRV, where the source terminal of the control transistor M1 may be coupled to a power supply terminal to receive the power supply voltage VDD, the drain terminal of the control transistor M1 may be coupled to the upper terminal of the driving transistor MDRV, and the gate terminal of the control transistor M1 may receive an emission control signal T_EM2. The control transistor M1 may serve as a switch for controlling the pixel circuit 20 to receive the power supply voltage VDD.

The control transistor M2 is coupled between the upper terminal and the gate terminal of the driving transistor MDRV, to serve as a switch for initialization and data reception. In detail, a first terminal of the control transistor M2 may be coupled to the upper terminal of the driving transistor MDRV, a second terminal of the control transistor M2 may be coupled to the gate terminal of the driving transistor MDRV, and the gate terminal of the control transistor M2 may receive an offset control signal T_AZ. The control transistor M2 may be used to conduct the gate terminal and the upper terminal of the driving transistor MDRV, to form a diode-connected structure when the input data Vdata is received, so as to obtain the information of the threshold voltage Vthp at the gate terminal of the driving transistor MDRV.

The control transistor M3 is coupled between the lower terminal and the gate terminal of the driving transistor MDRV, to serve as a switch for initialization. In detail, a first terminal of the control transistor M3 may be coupled to the lower terminal of the driving transistor MDRV, a second terminal of the control transistor M3 may be coupled to the gate terminal of the driving transistor MDRV, and the gate terminal of the control transistor M3 may receive an initialization control signal T_INI. The control transistor M3 may be used to initialize the driving transistor MDRV to a lower voltage in each operation cycle, allowing the input data Vdata to be successfully received by the driving transistor MDRV after initialization.

The control transistor M4 is coupled to the lower terminal of the driving transistor MDRV, to serve as a switch for controlling display data reception. In detail, a first terminal of the control transistor M4 may be coupled to a data input terminal of the pixel circuit 20 for receiving the input data Vdata, a second terminal of the control transistor M4 may be coupled to the lower terminal of the driving transistor MDRV, and the gate terminal of the control transistor M4 may receive a data enable signal T_DEN. The control transistor M4 may be used to control the pixel circuit 20 to receive the input data Vdata.

The control transistor M5 is coupled between the lower terminal of the driving transistor MDRV and the light emitting device L2, to serve as a switch for controlling light emission of the pixel circuit 20. In detail, a first terminal of the control transistor M5 may be coupled to the lower terminal of the driving transistor MDRV, a second terminal of the control transistor M5 may be coupled to the light emitting device L2, and the gate terminal of the control transistor M5 may receive an emission control signal T_EM1. The control transistor M5 may be used to control the currents generated by the driving transistor MDRV to flow to the light emitting device L2.

The light emitting device L2 includes a first terminal coupled to the control transistor M5 and a second terminal coupled to a reference voltage terminal to receive ground or negative voltage. The light emitting device L2, which is configured to emit light as being driven by the driving current $I_{drv2}$ received from the driving transistor MDRV, may be any device capable of emitting light by receiving currents, such as an OLED.

The operations of the pixel circuit 20 include three phases: a precharge phase, a scan phase and an emission phase. FIGS. 2A-2C illustrate the circuit structures and related waveforms of the control signals in the pixel circuit 20, where FIG. 2A shows the operations of the precharge phase, FIG. 2B shows the operations of the scan phase, and FIG. 2C shows the operations of the emission phase. Note that in the pixel circuit 20, the driving transistor MDRV and the control transistors M1-M5 are all PMOS transistors, and thus the signals in low level may turn on the corresponding transistors and in high level may turn off the corresponding transistors.

As shown in FIG. 2A, in the precharge phase (also called initial phase), the control transistors M2, M3, M4 and M5 are turned on, and the control transistor M1 is turned off. An initial voltage *Vini* may be received from the data input terminal. Since the control transistors M2, M3 and M4 are all turned on, the source, gate and drain terminals of the driving transistor MDRV are initialized or reset to the initial voltage *Vini*. Since the control transistor M5 is turned on, the anode of the light emitting device L2 is also initialized or reset to the initial voltage *Vini*. The control transistor M1 is turned off to prevent a current conducting path through the driving transistor MDRV and the light emitting device L2 to generate unnecessary current consumption.

In the precharge phase, the light emitting device L2 should not emit light; hence, the value of the initial voltage *Vini* should be low enough to control the current flowing through the light emitting device L2 to be lower than a specific threshold so that the light emitting device L2 is prevented from emitting unwanted light. The value of the initial voltage *Vini* received by the driving transistor MDRV should also be low enough to ensure that the input data Vdata can be successfully input to the driving transistor MDRV in the next phase. Otherwise, if the level of the initial voltage *Vini* is excessively high, the initial voltage *Vini* at the gate terminal of the driving transistor MDRV may turn off the driving transistor MDRV. For example, the initial voltage *Vini* should be smaller than the minimal data voltage with a difference greater than the threshold voltage Vthp, i.e., to satisfy Vdata-*Vini*>Vthp. In an embodiment, the minimal input data Vdata may be 4V, and the initial voltage *Vini* may be equal to 2V to achieve the purposes of turning on the driving transistor MDRV and turning off the light emitting device L2.

As shown in FIG. 2B, in the scan phase, the control transistors M2 and M4 are turned on, and the control transistors M1, M3 and M5 are turned off. The input data Vdata may be received from the data input terminal. In this embodiment, the pixel circuit 20 may receive the initial voltage *Vini* from the data input terminal in the precharge phase, and receive the input data Vdata from the data input terminal in the scan phase. In other words, the initial voltage *Vini* and the input data Vdata are received from the same terminal, so that the deployment of signal/data lines on the display panel may be simplified.

In the scan phase, the driving transistor MDRV receives the input data Vdata through the control transistor M4, and the gate terminal of the driving transistor MDRV starts to be charged. At this moment, the lower terminal of the MDRV may be regarded as the source terminal, which receives the input data Vdata to generate the gate voltage Vdata-Vthp' with the source-to-gate voltage Vsg of the driving transistor MDRV equal to Vthp', where Vthp' is the threshold voltage of the driving transistor MDRV in consideration of body effect (slightly different from the intrinsic threshold voltage Vthp without body effect). The charges corresponding to the gate voltage Vdata-Vthp' will be stored in the storage capacitor C2. Since the control transistor M2 is turned on, the upper terminal (which may be regarded as the drain terminal in this phase) of the driving transistor MDRV may also be charged to the voltage Vdata-Vthp'. After the gate voltage of the driving transistor MDRV reaches Vdata-Vthp', the driving transistor MDRV may become cutoff and stop charging at the end of the scan phase.

As mentioned above, the driving transistor MDRV is initialized or reset to the initial voltage *Vini* in the precharge phase prior to the scan phase. At the start of the scan phase, the initial voltage *Vini* is low enough to ensure that the driving transistor MDRV is turned on when the input data Vdata arrives.

In the scan phase, the control transistor M2 is turned on by the offset control signal T_AZ, and thus the control transistor M2 and the driving transistor MDRV may form a diode-connected structure. The diode-connected structure allows the driving transistor MDRV to generate the gate voltage Vdata-Vthp' containing the information of the threshold voltage Vthp', which may be stored in the storage capacitor C2 at the end of the scan phase.

As shown in FIG. 2C, in the emission phase, the control transistors M1 and M5 are turned on, and the control transistors M2, M3 and M4 are turned off. The turn-on control transistor M1 may charge the upper terminal of the driving transistor MDRV to the power supply voltage VDD. In this phase, the upper terminal of the driving transistor MDRV may be regarded as the source terminal of the driving transistor MDRV since this upper terminal receives the power supply voltage VDD which may be higher than the voltage at the lower terminal of the driving transistor MDRV. The voltage at the lower terminal of the driving transistor MDRV is equal to the anode voltage of the light emitting device L2, $V_{EM}$, which is a voltage generated by the light emitting device L2 under the driving current $I_{DRV2}$.

At this moment, the source-to-gate voltage Vsg of the driving transistor MDRV may be equal to VDD–(Vdata–Vthp'), which is used to determine the magnitude of the driving current $I_{drv2}$ to be used for driving the light emitting device L2. The control transistor M5 is also turned on to pass the driving current $I_{drv2}$ to the light emitting device L2, allowing the light emitting device L2 to emit light. Similarly, the operations of the driving transistor MDRV in the pixel circuit 20 may follow the square law or exponential law based on the implementations and corresponding device mobility. Taking the square law as an example, the driving current $I_{drv2}$ may be calculated as follows:

$$I_{drv2} = \frac{1}{2}\beta[Vsg - Vthp]^2; \tag{3}$$

$$I_{drv2} = \frac{1}{2}\beta[VDD - (Vdata - Vthp') - Vthp]^2; \tag{4}$$

where the definition of the parameter B is identical to that described in Equation (1), and will not be repeated herein.

Since the threshold voltage Vthp' includes the body effect where the drain voltage of the driving transistor MDRV is equal to Vdata, Equation (4) may be rewritten as:

$$I_{drv2} = \frac{1}{2}\beta\left[VDD - \left(Vdata - \left(Vthp + \gamma\left(\sqrt{2\Phi F + VDD - Vdata} - \sqrt{2\Phi F}\right)\right)\right) - Vthp\right]^2. \tag{5}$$

In Equation (5), the threshold voltage Vthp may be canceled out to become:

$$I_{drv2} = \frac{1}{2}\beta\left[VDD - Vdata + \gamma\left(\sqrt{2\Phi F + VDD - Vdata} - \sqrt{2\Phi F}\right)\right]^2; \tag{6}$$

where $\gamma$ is the body effect parameter, and $2\Phi F$ is the surface potential.

As can be seen, the formula for calculating the driving current $I_{drv2}$ only includes a signal dependent term consisting of the input data Vdata, and will not depend on the threshold voltage Vthp, which means that the offset of the threshold voltage Vthp between pixels will not influence the current magnitude and the brightness of the light emitting device L2. Other parameters such as $\beta$ or $\gamma$ may not generate significant mismatch or offset that needs to be canceled. As a result, the problem of brightness non-uniformity may be solved.

During the operations of the pixel circuit 20, the control transistors M1-M5 are controlled by the initialization control signal T_INI, the data enable signal T_DEN, the offset control signal T_AZ, and the emission control signals T_EM1 and T_EM2. Note that the waveforms of these signals shown in FIGS. 2A-2C are merely an example for illustrating a method of handling the operations by allocating the turn-on time and turn-off time of several control signals. For example, at the start of the emission phase, the data enable signal T_DEN turns off the control transistor M4 slightly earlier than the offset control signal T_AZ turns off the control transistor M2, as shown in FIGS. 2A-2C. Alternatively, the data enable signal T_DEN and the offset control signal T_AZ may toggle simultaneously, or the offset control signal T_AZ may toggle earlier. In another embodiment, the control transistors M2 and M4 may be controlled by the same control signal. In addition, at the start of the emission phase, the emission control signal T_EM2 turns on the control transistor M1 slightly earlier than the emission control signal T_EM1 turns on the control transistor M5, as shown in FIGS. 2A-2C. In another embodiment, these control signals' toggling order may also be modified.

Figure 3A:
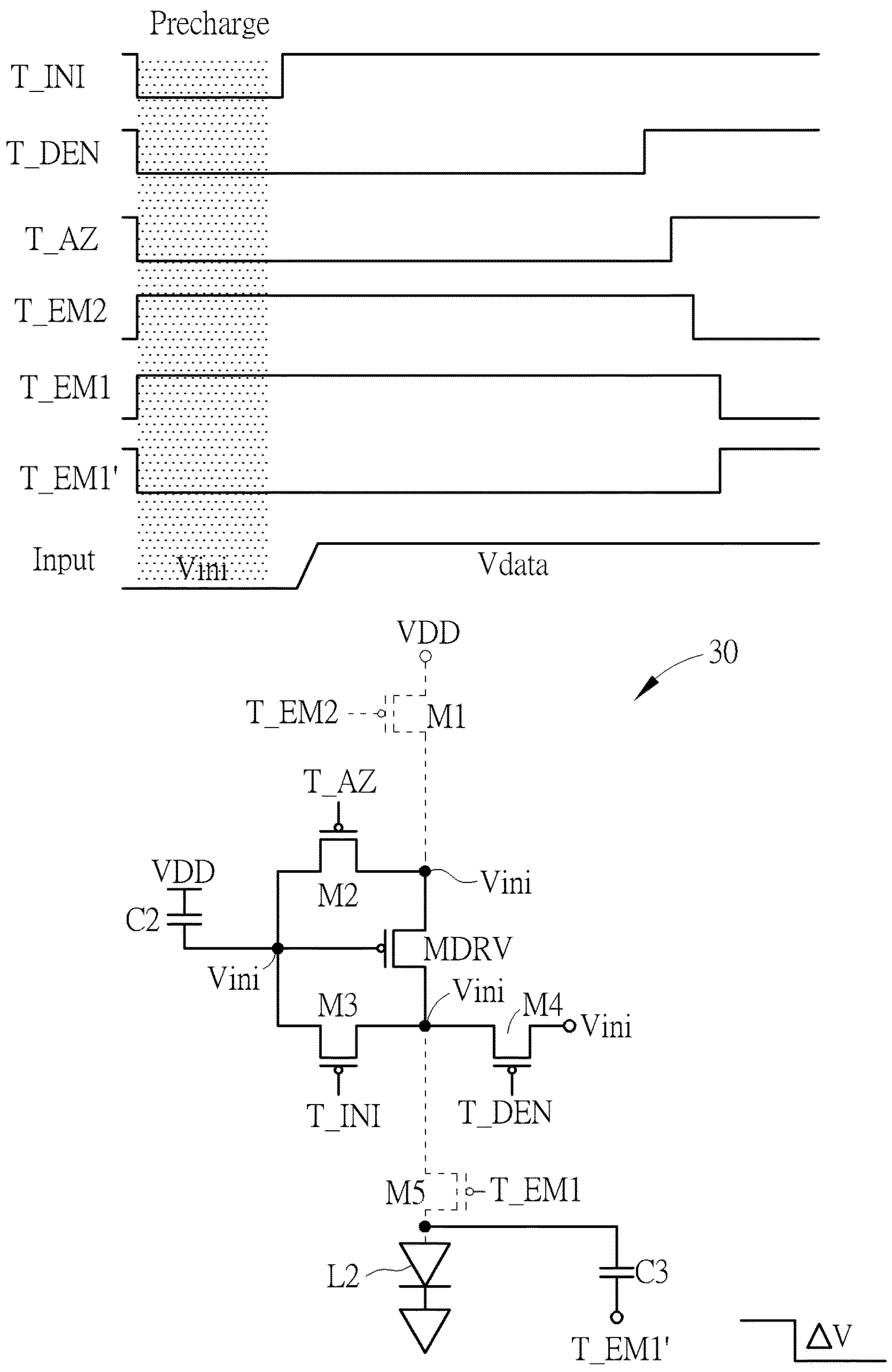
FIGS. 3A, 3B and 3C are schematic diagrams of a pixel circuit of a display panel according to an embodiment of the present invention.
Figure 3B:
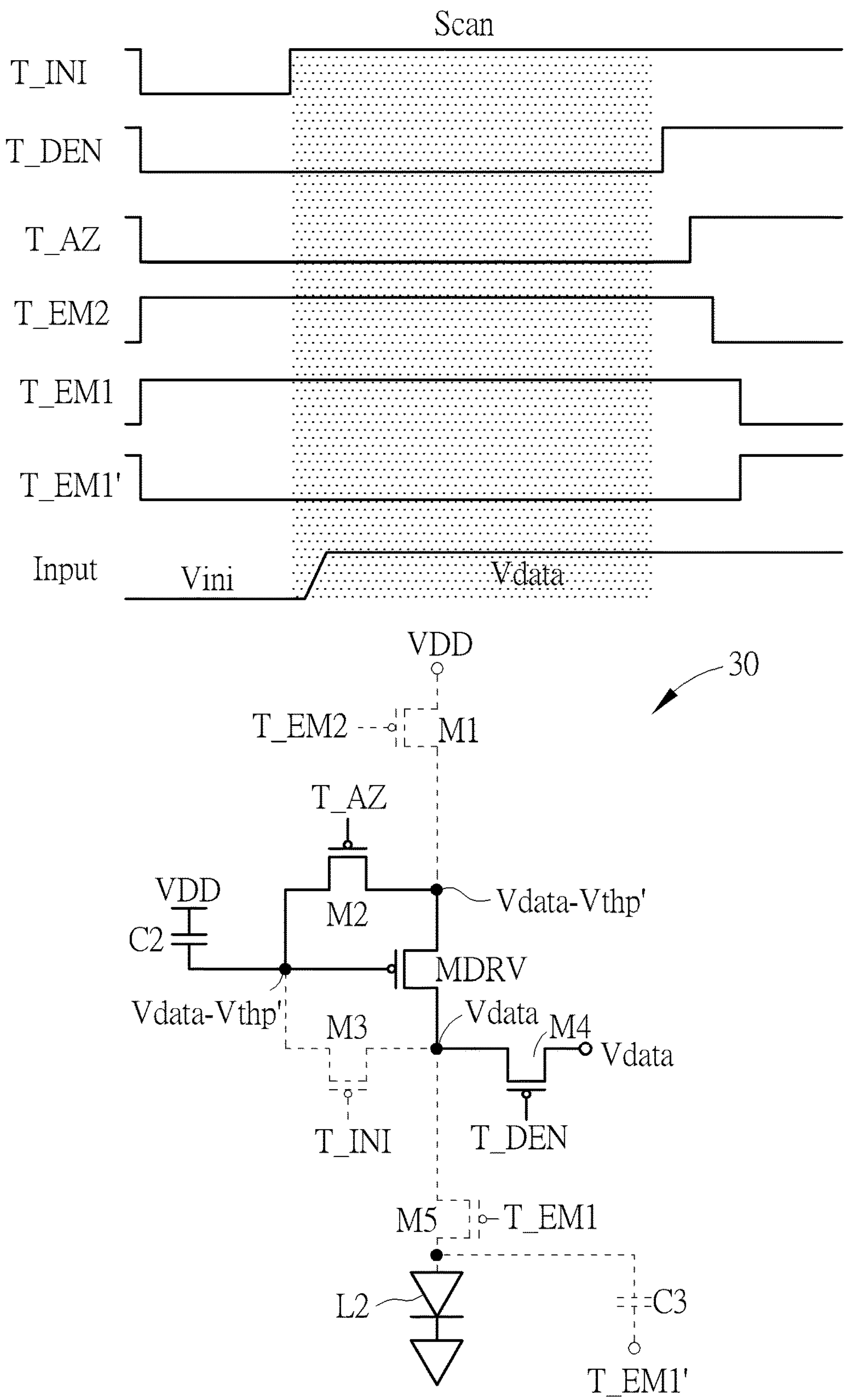
Figure 3C:
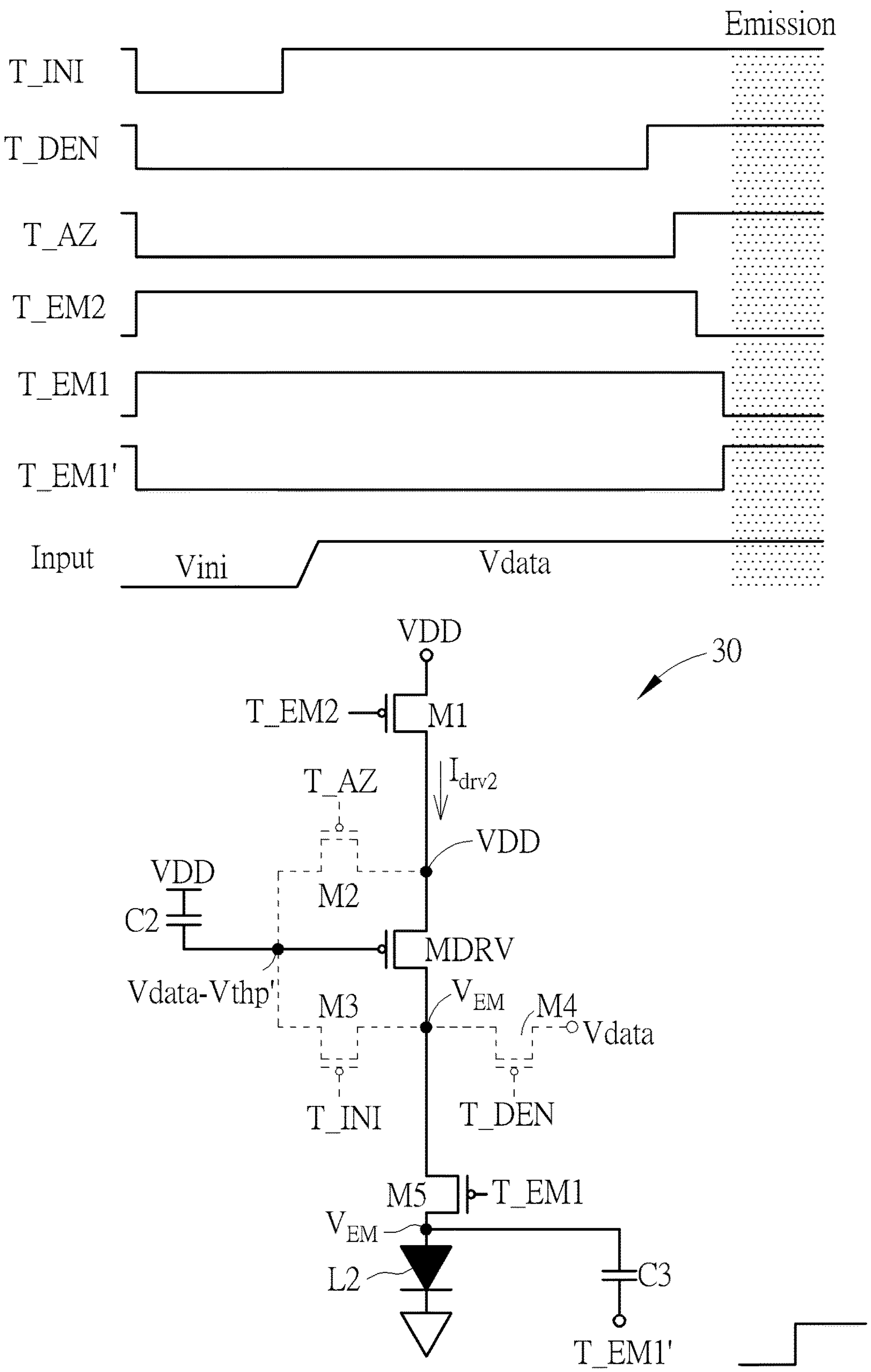

Also note that the structure of the pixel circuit 20 shown in FIGS. 2A-2C is merely an example, and may be modified or adjusted to improve the performance. FIGS. 3A-3C are schematic diagrams of a pixel circuit 30 of a display panel according to an embodiment of the present invention. The structure of the pixel circuit 30 is similar to the structure of the pixel circuit 20, so signals and elements having similar functions are denoted by the same symbols. The difference between the pixel circuit 30 and the pixel circuit 20 is that, the pixel circuit 30 further includes a coupling capacitor C3, which is coupled to the anode of the light emitting device L2. Similarly, FIGS. 3A-3C illustrate the circuit structures and related waveforms of the control signals in the pixel circuit 30 for the precharge phase, the scan phase and the emission phase, respectively, and the operations are similar to those illustrated in FIGS. 2A-2C.

In this embodiment, the control transistor M5 is turned off in the precharge phase. Therefore, the initial voltage Vini is only used to initialize the driving transistor MDRV, while the light emitting device L2 is initialized or reset through the coupling capacitor C3. The coupling capacitor C3 may couple an emission off signal T_EM1' to the anode of the light emitting device L2 to perform initialization. At the start of the precharge phase, the emission off signal T_EM1' has a falling voltage $\Delta V$, which is coupled to the anode of the light emitting device L2 to prevent the light emitting device L2 from emitting light in the precharge phase (and also in the scan phase). In an embodiment, the emission off signal T_EM1' may be an inverse signal of the emission control signal T_EM1 that controls the control transistor M5.

In the pixel circuit 20, the light emitting device L2 is initialized by using the initial voltage Vini. The initial voltage Vini is forwarded through PMOS switches, and may not be easily forwarded if the value of the initial voltage Vini approaches 0V. In contrast, in the pixel circuit 30, the light emitting device L2 is initialized by coupling the falling voltage $\Delta V$ to its anode, allowing the anode voltage to decrease to an extremely low level, even lower than 0V. This ensures that the light emitting device L2 will not emit unwanted light in the precharge phase and the scan phase.

As mentioned above, the pixel circuit of the present invention is applicable to a micro-OLED panel, which is implemented with the CMOS process having a higher mobility; hence, a general current operation range of the light emitting diode (e.g., between 10 pA and 5 nA) may be generated by using small data voltages, which are within an input voltage range of 200 mV. This input voltage range is quite small and cannot be easily implemented to generate a desired gamma curve.

Figure 4A:
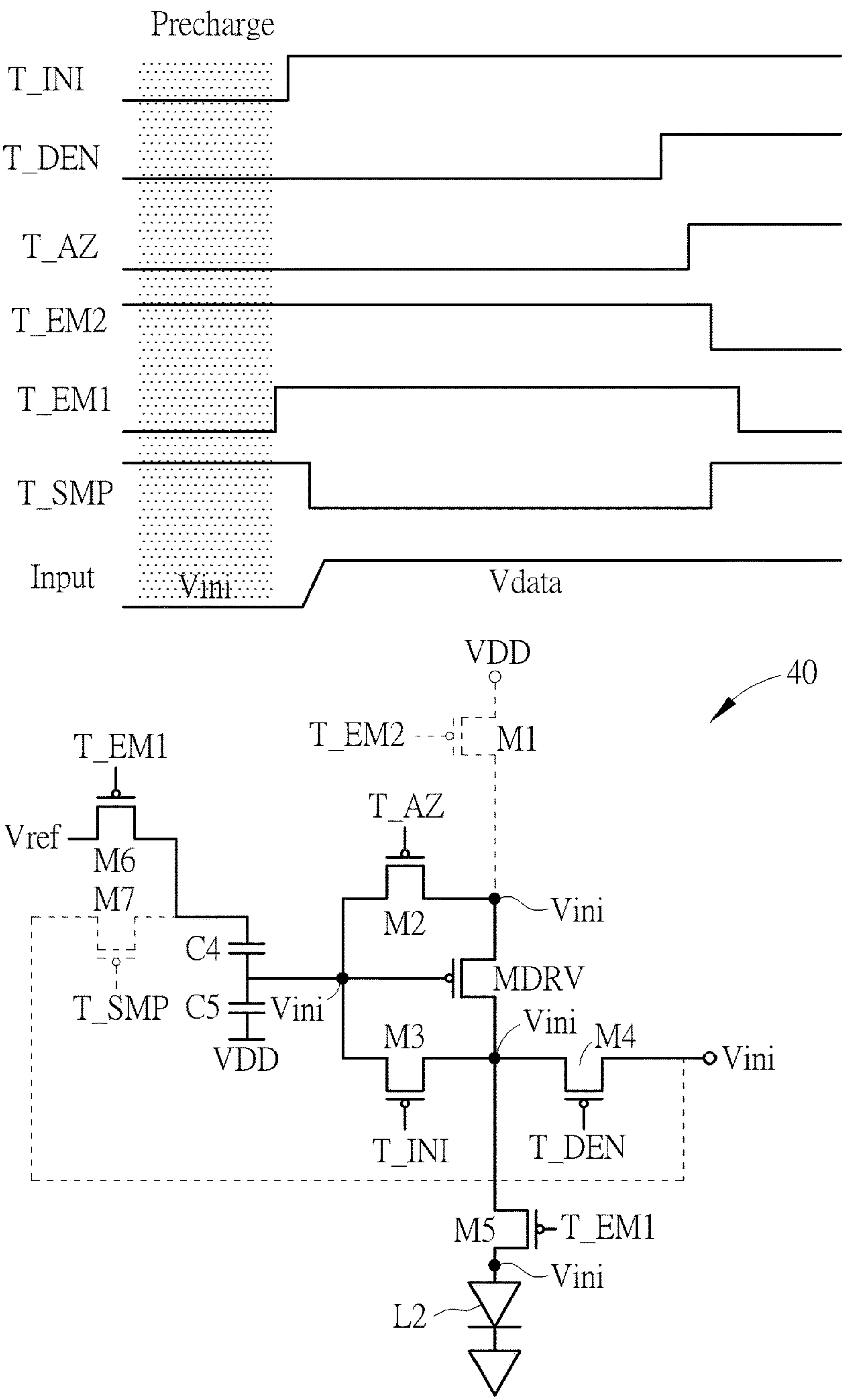
FIGS. 4A, 4B and 4C are schematic diagrams of a pixel circuit of a display panel according to an embodiment of the present invention.
Figure 4B:
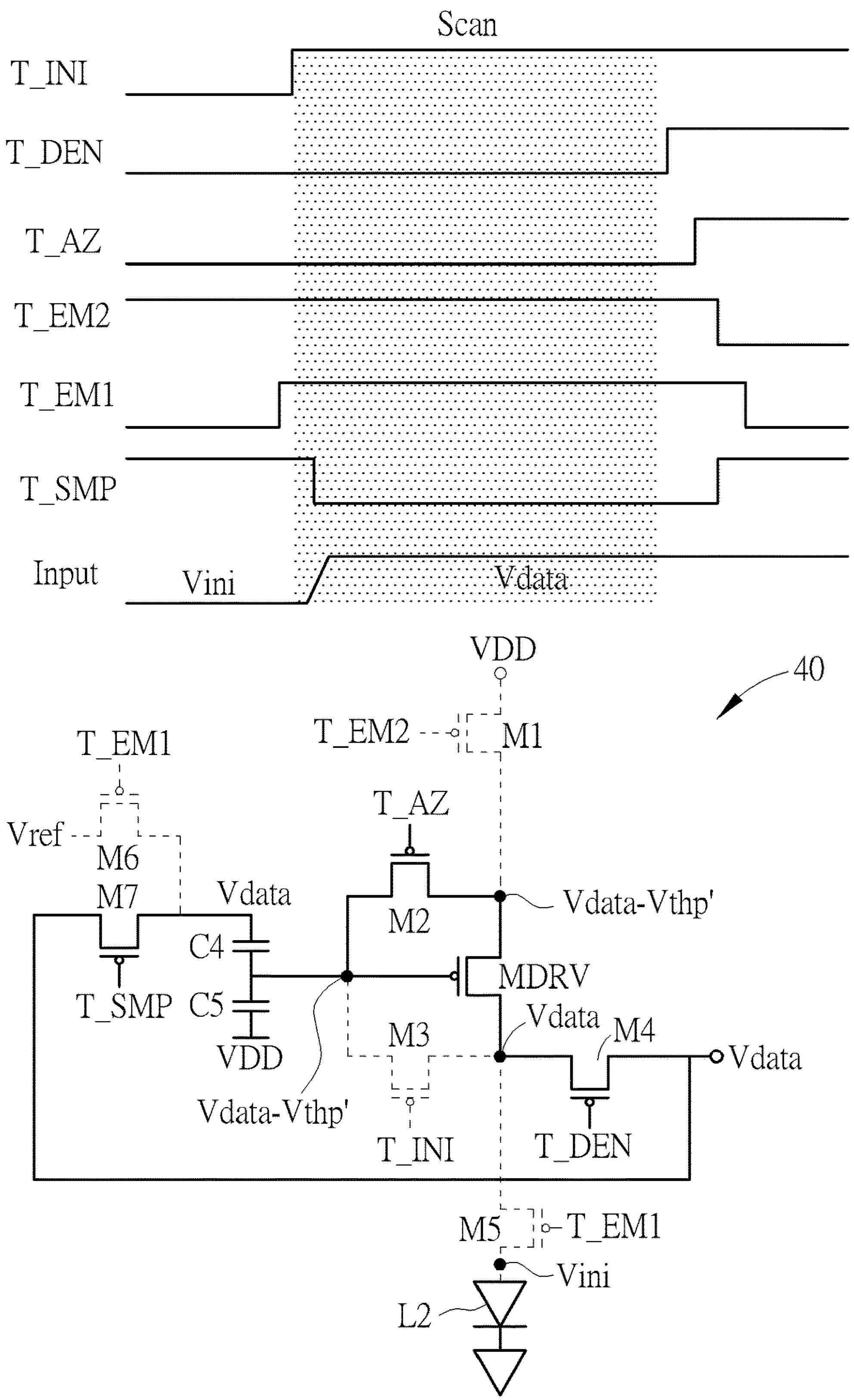
Figure 4C:
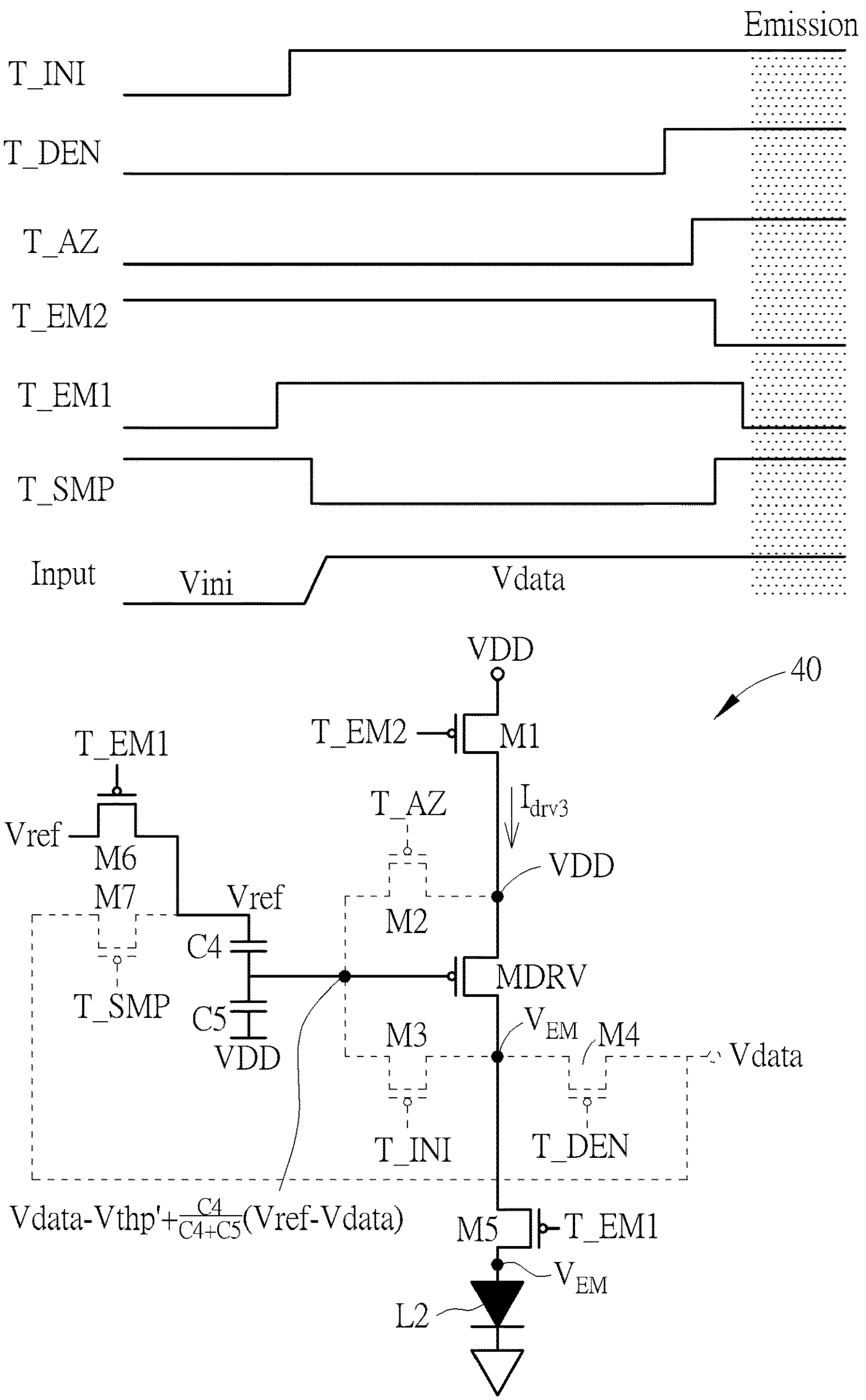

In order to increase the input voltage range, an improvement of the pixel circuit 20 may be applied. Please refer to FIGS. 4A-4C, which are schematic diagrams of a pixel circuit 40 of a display panel according to an embodiment of the present invention. The structure of the pixel circuit 40 is similar to the structure of the pixel circuit 20, so signals and elements having similar functions are denoted by the same symbols. The difference between the pixel circuit 40 and the pixel circuit 20 is that, the pixel circuit 40 further includes control transistors M6 and M7 and a capacitor C4 coupled to the gate terminal of the driving transistor MDRV. Similarly, FIGS. 4A-4C illustrate the circuit structures and related waveforms of the control signals in the pixel circuit 40 for the precharge phase, the scan phase and the emission phase, respectively, and the operations are similar to those illustrated in FIGS. 2A-2C.

In this embodiment, a first terminal of the capacitor C4 is coupled to the gate terminal of the driving transistor MDRV, and a second terminal of the capacitor C4 is coupled to the control transistors M6 and M7. The control transistor M6 may serve as a switch for receiving a positive reference voltage Vref, where a first terminal of the control transistor M6 may be coupled to the capacitor C4, a second terminal of the control transistor M6 may be coupled to a positive reference voltage terminal for receiving the positive reference voltage Vref, and the gate terminal of the control transistor M6 may receive the emission control signal T_EM1. The positive reference voltage Vref may be any appropriate positive voltage. In an embodiment, the positive reference voltage Vref is equal to or less than the power supply voltage VDD. The control transistor M7 may serve as a switch for receiving the input data Vdata, where a first terminal of the control transistor M7 may be coupled to the capacitor C4, a second terminal of the control transistor M7 may be coupled to the data input terminal for receiving the input data Vdata, and the gate terminal of the control transistor M7 may receive a sampling control signal T_SMP.

Another capacitor C5, which is further illustrated in the pixel circuit 40, may be an actually deployed capacitor or parasitic capacitor. If the capacitor C5 is actually deployed, it may be coupled between the gate terminal of the driving transistor MDRV and a power supply terminal for receiving the power supply voltage VDD, as shown in FIGS. 4A-4C.

The control method of the pixel circuit 40 is similar to the control method of the pixel circuit 20, except that the pixel circuit 40 receives an additional sampling control signal T_SMP, which may turn on the control transistor M7 in the scan phase and turn off the control transistor M7 in the precharge phase and the emission phase.

In the scan phase, the control transistor M7 is turned on and the control transistor M6 is turned off, and the second terminal of the capacitor C4 receives the input data Vdata through the control transistor M7. Meanwhile, the first terminal of the capacitor C4 receives the gate voltage of the driving transistor MDRV which is equal to Vdata-Vthp', and thus the information of the threshold voltage Vthp' is stored. Subsequently, in the emission phase, the control transistor M6 is turned on and the control transistor M7 is turned off, and the second terminal of the capacitor C4 receives the positive reference voltage Vref. The voltage difference Vref-Vdata at the second terminal of the capacitor C4 is coupled to its first terminal, to move the gate voltage of the driving transistor MDRV to $$Vdata - Vthp' + \frac{C4}{C4 + C5}(Vref - Vdata).$$

In a similar manner, the driving current $I_{drv3}$ for driving the light emitting device L2 of the pixel circuit 40 in the emission phase may be calculated based on the source-to-gate voltage Vsg of the driving transistor MDRV, which is expressed as:

$$I_{drv3} = \frac{1}{2}\beta\left[VDD - Vdata + \gamma\left(\sqrt{2\Phi F + VDD - Vdata} - \sqrt{2\Phi F}\right) - \frac{C4}{C4 + C5}(Vref - Vdata)\right]^2; \quad (7)$$

where the threshold voltage Vthp is perfectly canceled. Equation (7) may further be rearranged as:

$$I_{drv3} = \frac{1}{2}\beta\left[VDD - \frac{C5}{C4 + C5}Vdata + \gamma\left(\sqrt{2\Phi F + VDD - Vdata} - \sqrt{2\Phi F}\right) - \frac{C4}{C4 + C5}Vref\right]^2. \quad (8)$$

In an embodiment, the positive reference voltage Vref may be equal to the power supply voltage VDD, and thus Equation (8) may further be simplified as:

$$I_{drv3} = \frac{1}{2}\beta\left[\frac{C5}{C4 + C5}(VDD - Vdata) + \gamma\left(\sqrt{2\Phi F + VDD - Vdata} - \sqrt{2\Phi F}\right)\right]^2. \quad (9)$$

As can be seen in Equation (8) or (9), the factor of the input data Vdata is divided by a ratio C5/(C4+C5), which means that the same current range may be generated by a larger input data range. It should be noted that the input data range becomes larger if the value of the capacitor C5 is smaller; hence, it is preferable to take the parasitic capacitor at the gate terminal of the driving transistor MDRV to realize the capacitor C5.

As a result, based on the structure of the pixel circuit 40, a larger variation of the input data Vdata may be applied to generate a target current range for driving the light emitting device L2, thereby increasing the input data range. The increased input data range facilitates the settings of the gamma curve, so as to realize a satisfactory visual effect.

Figure 5A:
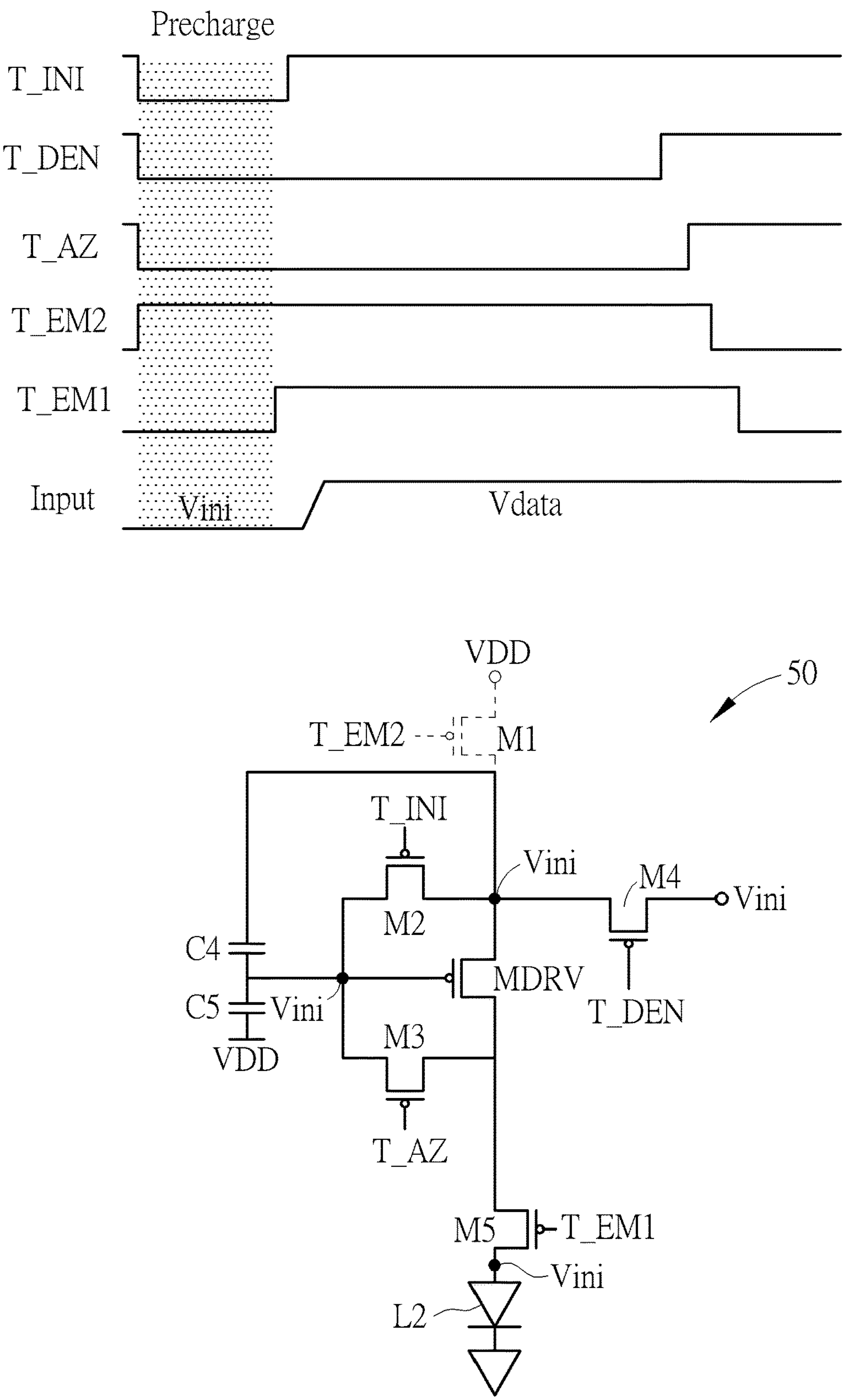
FIGS. 5A, 5B and 5C are schematic diagrams of another pixel circuit of a display panel according to an embodiment of the present invention.
Figure 5B:
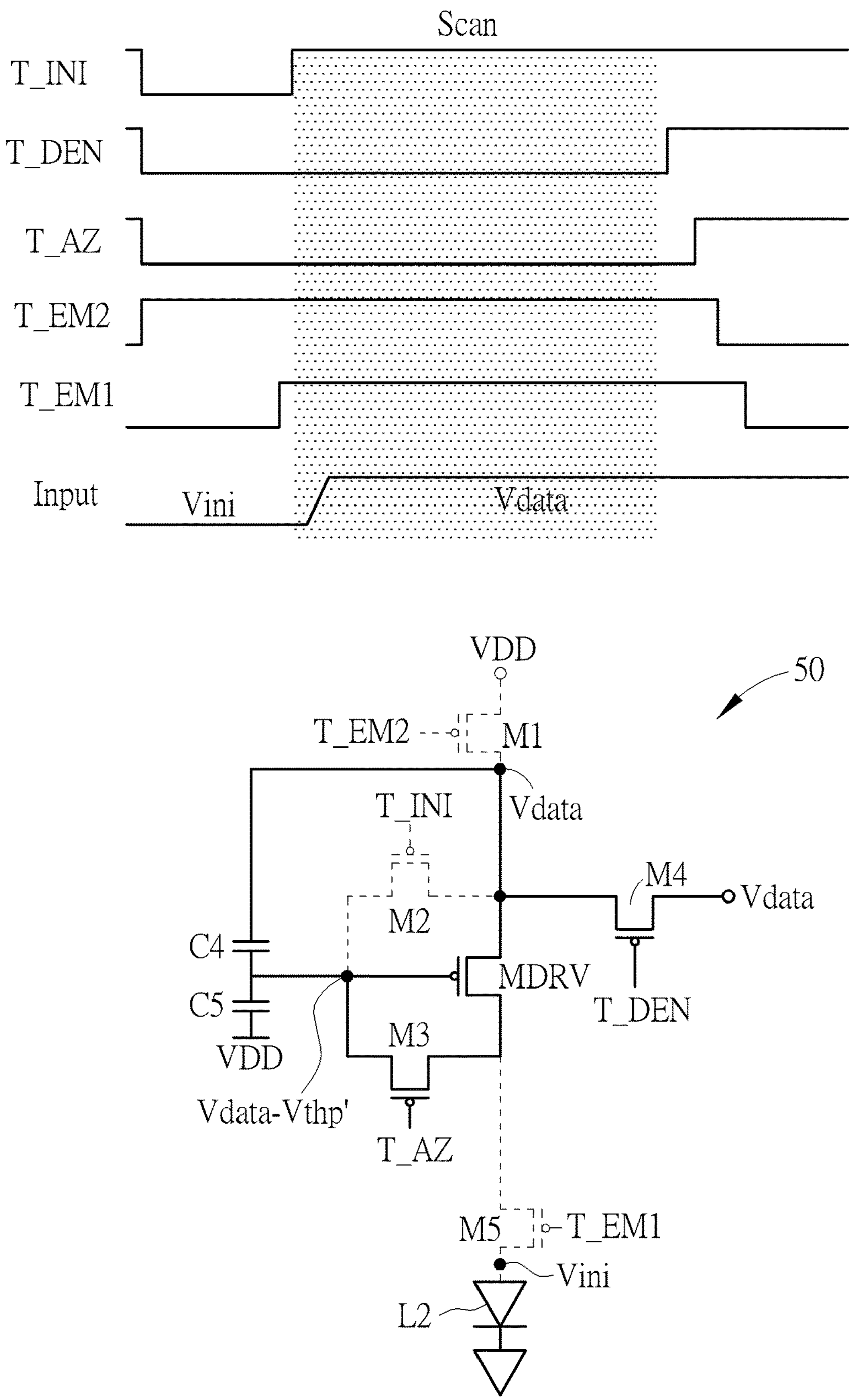
Figure 5C:
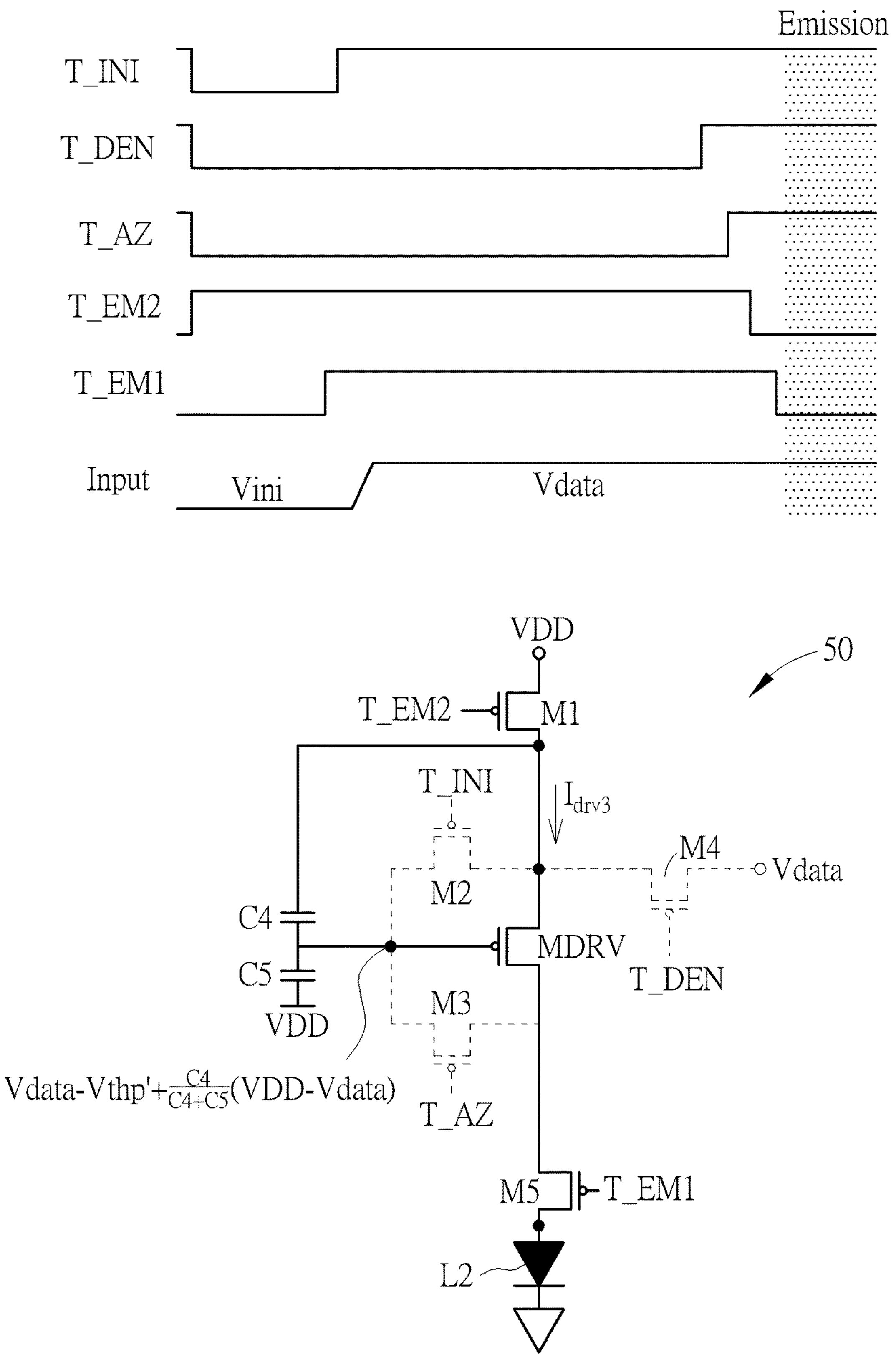

Please refer to FIGS. 5A-5C, which are schematic diagrams of another pixel circuit 50 of a display panel according to an embodiment of the present invention. The structure of the pixel circuit 50 is similar to the structure of the pixel circuit 40, so signals and elements having similar functions are denoted by the same symbols. The difference between the pixel circuit 50 and the pixel circuit 40 is that, in the pixel circuit 50, the control transistor M4 for receiving the initial voltage Vini and the input data Vdata is coupled to the upper terminal of the driving transistor MDRV. Correspondingly, the control transistor M2, which is coupled between the upper terminal (which may be the source terminal) and the gate terminal of the driving transistor MDRV, is controlled by the initialization control signal T_INI, and the control transistor M3, which is coupled between the lower terminal (which may be the drain terminal) and the gate terminal of the driving transistor MDRV, is controlled by the offset control signal T_AZ. That is, the roles played by the control transistor M2 and the control transistor M3 are exchanged. In such a situation, in the scan phase, the control transistor M3 is conducted with the driving transistor MDRV to form the diode-connected structure, while the control transistor M2 is off.

Similarly, the capacitors C4 and C5 are used for dividing the voltage of the input data Vdata to increase the input voltage range. In this embodiment, the capacitor C4 is coupled between the upper terminal and the gate terminal of the driving transistor MDRV, and the capacitor C5 is coupled between the gate terminal of the driving transistor MDRV and a power supply terminal that supplies the power supply voltage VDD. The capacitor C5 may be an actually deployed capacitor or parasitic capacitor. In the pixel circuit 50, the formula for calculating the driving current $I_{DRV3}$ for driving the light emitting device L2 may also be referred to Equation (8) or (9). The structure of the pixel circuit 50 may achieve the effect of increasing the input voltage range by using only 6 transistors, which may be simpler and more cost-saving than the 8-transistor structure of the pixel circuit 40.

Similarly, the waveforms of the control signals in the pixel circuit 50 for the precharge phase, the scan phase and the emission phase are shown in FIGS. 5A-5C, respectively. Other operations of the pixel circuit 50 are similar to those described in the above paragraphs, and will not be repeated herein.

Please note that the present invention aims at providing a novel pixel circuit for canceling the offset generated from the threshold voltage of the driving transistor. Those skilled in the art may make modifications and alterations accordingly. For example, in the above embodiments, the transistors in the pixel circuit are PMOS transistors; but in other embodiments, similar implementations may be realized by using NMOS transistors, where the control signals and the initial voltage may be modified accordingly. In addition, the driving transistor may be operated in the saturation region to follow the abovementioned equations, or in the sub-threshold region or linear region to follow another formula based on the exponential law, depending on the application of the display panel. The threshold voltage may be canceled in a similar manner when the exponential law is applied. Further, the pixel circuit of the present invention may be applied to any self-luminous panel, which includes, but not limited to, an OLED panel, mini-LED panel, micro-LED panel, and micro-OLED panel.

To sum up, the present invention provides a pixel circuit for canceling the offset generated from the threshold voltage of the driving transistor. In the scan phase, the driving transistor may receive the input data through a lower terminal that is coupled to the light emitting device, and the input data with information of the threshold voltage are received at the gate terminal of the driving transistor and stored in the storage capacitor, and then canceled in the emission phase. In an embodiment, the light emitting device may be initialized by using a coupling capacitor, which couples a falling voltage to prevent the light emitting device from emitting unwanted light in the precharge phase and the scan phase. In an embodiment, a capacitor is coupled between the data input terminal and the gate terminal of the driving transistor, to divide the input data by a ratio when the input data is applied to generate the driving current in the emission phase, so as to increase the input voltage range. In another embodiment, the driving transistor may receive the input data through an upper terminal, i.e., the source terminal, with a capacitor coupled between the upper terminal and the gate terminal of the driving transistor, so as to achieve the effect of increasing the input voltage range with a fewer number of transistors and simpler circuit structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel circuit of a display panel, comprising:
- a driving transistor, comprising a first terminal, a second terminal and a gate terminal;
- a first transistor, comprising:
  - a first terminal, coupled to a power supply terminal; and
  - a second terminal, coupled to the first terminal of the driving transistor;
- a second transistor, comprising:
  - a first terminal, coupled to the first terminal of the driving transistor; and
  - a second terminal, coupled to the gate terminal of the driving transistor;
- a third transistor, comprising:
  - a first terminal, coupled to the second terminal of the driving transistor; and
  - a second terminal, coupled to the gate terminal of the driving transistor;
- a fourth transistor, comprising:
  - a first terminal, coupled to a data input terminal of the pixel circuit; and
  - a second terminal, coupled to the second terminal of the driving transistor;
- a fifth transistor, comprising:
  - a first terminal, coupled to the second terminal of the driving transistor; and
  - a second terminal;
- a light emitting device, comprising:
  - a first terminal, coupled to the second terminal of the fifth transistor; and
  - a second terminal, coupled to a reference voltage terminal;
- a first capacitor, comprising:
  - a first terminal, coupled to the gate terminal of the driving transistor; and
  - a second terminal;
- a sixth transistor, comprising:
  - a first terminal, coupled to the second terminal of the first capacitor; and
  - a second terminal; and
- a seventh transistor, comprising:
  - a first terminal, coupled to the second terminal of the first capacitor; and
  - a second terminal, coupled to the data input terminal.

2. The pixel circuit of claim 1, further comprising:
- a capacitor, coupled between the gate terminal of the driving transistor and the power supply terminal.

3. The pixel circuit of claim 1, wherein the pixel circuit is configured to receive an initial voltage from the data input terminal in a precharge phase, and receive an input data from the data input terminal in a scan phase.

4. The pixel circuit of claim 1, wherein the second transistor and the driving transistor form a diode-connected structure in a scan phase.

5. The pixel circuit of claim 1, wherein the second transistor and the third transistor are turned on to initialize the driving transistor in a precharge phase.

6. The pixel circuit of claim 1, wherein the first transistor and the fifth transistor are turned on to pass a current to the light emitting device in an emission phase.

7. The pixel circuit of claim 1, further comprising:
- a capacitor, coupled to the first terminal of the light emitting device, configured to couple an emission off signal to the light emitting device.

8. The pixel circuit of claim 1, further comprising:

a second capacitor, comprising:

a first terminal, coupled to the gate terminal of the driving transistor; and a second terminal, coupled to the power supply terminal.

9. A pixel circuit of a display panel, comprising:

a driving transistor, comprising a first terminal, a second terminal and a gate terminal;

a first transistor, comprising:

a first terminal, coupled to a power supply terminal; and a second terminal, coupled to the first terminal of the driving transistor;

a second transistor, comprising:

a first terminal, coupled to the first terminal of the driving transistor; and a second terminal, coupled to the gate terminal of the driving transistor;

a third transistor, comprising:

a first terminal, coupled to the second terminal of the driving transistor; and a second terminal, coupled to the gate terminal of the driving transistor;

a fourth transistor, comprising:

a first terminal, coupled to a data input terminal of the pixel circuit; and a second terminal, directly connected to the first terminal of the driving transistor;

a fifth transistor, comprising:

a first terminal, coupled to the second terminal of the driving transistor; and a second terminal;

a light emitting device, comprising:

a first terminal, coupled to the second terminal of the fifth transistor; and a second terminal, coupled to a reference voltage terminal; and a first capacitor, comprising:

a first terminal, coupled to the gate terminal of the driving transistor; and a second terminal, coupled to the first terminal of the driving transistor.

* * * * *